Jan. 5, 1926. 1,568,179
H. P. OLSEN
SHOCKER
Filed July 9, 1921 8 Sheets-Sheet 1

Fig. 1.

HANS P. OLSEN INVENTOR.

BY
Richard B. Owen
ATTORNEY

WITNESSES

Jan. 5, 1926.

1,568,179

H. P. OLSEN

SHOCKER

Filed July 9, 1921    8 Sheets-Sheet 4

HANS P. OLSEN INVENTOR.

BY

ATTORNEY.

WITNESSES

Jan. 5, 1926.

H. P. OLSEN

SHOCKER

Filed July 9, 1921    8 Sheets-Sheet 5

1,568,179

WITNESSES

HANS P. OLSEN    INVENTOR.

BY

ATTORNEY.

Jan. 5, 1926.

H. P. OLSEN 1,568,179

SHOCKER

Filed July 9, 1921  8 Sheets-Sheet 6

WITNESSES

HANS P. OLSEN INVENTOR.

BY

ATTORNEY.

Jan. 5, 1926.

H. P. OLSEN

SHOCKER

Filed July 9, 1921   8 Sheets-Sheet 7

1,568,179

HANS P. OLSEN  INVENTOR.

BY

ATTORNEY.

WITNESSES

Jan. 5, 1926.

H. P. OLSEN

SHOCKER

Filed July 9, 1921  8 Sheets-Sheet 8

1,568,179

HANS P. OLSEN INVENTOR.

BY
ATTORNEY.

Patented Jan. 5, 1926.

1,568,179

UNITED STATES PATENT OFFICE.

HANS P. OLSEN, OF ESTHER, ALBERTA, CANADA.

SHOCKER.

Application filed July 9, 1921. Serial No. 483,614.

*To all whom it may concern:*

Be it known that I, HANS P. OLSEN, a subject of the King of Great Britain, residing at Esther, in the Province of Alberta and Dominion of Canada, have invented certain new and useful Improvements in a Shocker, of which the following is a specification.

The object of this invention is broadly to provide a machine of simple, durable, and inexpensive construction designed to be connected with and to operate in a field by the side of any ordinary binder to receive the bundles or sheaves of grain and the like from the binder, convey them to a shock former, and to tightly press them into a shock of such size as the operator may determine and when thus formed into a shock and tightly compressed to stand the shock in an upright position upon the ground surface, all of which operations may be accomplished without stopping the machine, and the operator of the binder may perform all operations necessary for the shocker attachment.

With the above and numerous other objects in view the invention consists of certain novel features of construction, and the combination and arrangement of parts as will be hereinafter more fully described and claimed.

The shocker illustrated in the accompanying drawings is adapted to be used with any ordinary binder and is to be pulled forwardly by any desired draft means such as having the draft means attached directly to the shocker or by having braces extending from the shocker so as to securely hold the same adjacent the binder so that it will move forwardly therewith.

Figure 5:
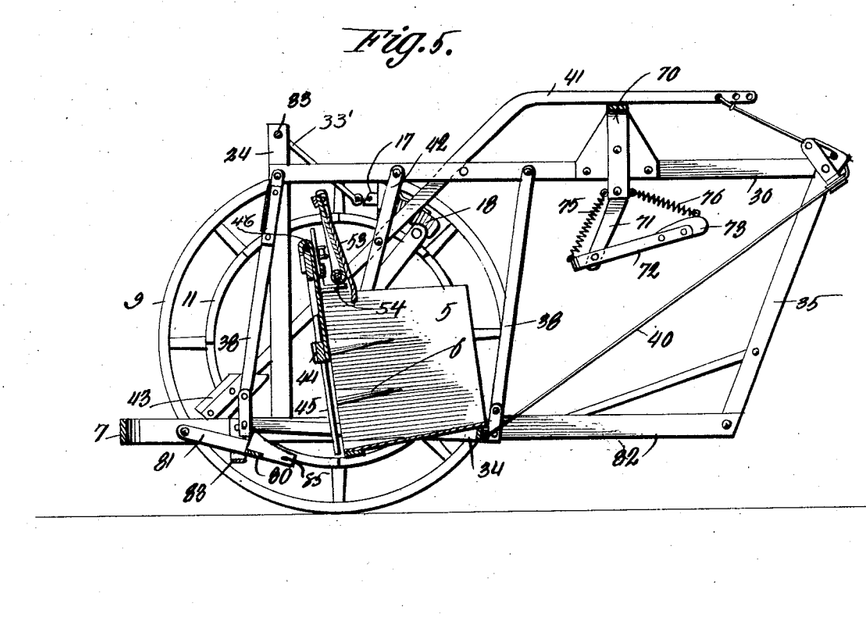
Figure 5 is a longitudinal sectional view taken on line 5—5 of Figure 4, Figures 6 and 7 are views taken on the same line as Figure 5 showing the basket collector in various positions during its operation.

Referring to the drawing in detail it will be seen that the numeral 1 designates the delivery mechanism which may be of any preferred construction and in the present instance consists of a pair of parallel spaced chains 1' connected by cross bars 2 having the usual teeth 3' thereon for engaging the sheaves so as to elevate them to the upper portion of the shocker. These chains may be operated in any suitable manner. At the top of the elevating mechanism 1 I have provided a hingedly mounted plate 3 which when in a vertical position will prevent the sheaves from being delivered to the shocker. The sheaves are delivered over the elevating mechanism 1 so as to fall into the basket collector 5 which will be in the position as is shown in Figure 5. This basket collector 5 consists of three walls each of which is provided with a plurality of spreading wedges 6 for spreading the bottom portion of the shock after the same has been formed. Both ends of the basket collector 5 are open and one side thereof that is the upper side as shown in Figure 5 is normally open so as to receive the sheaves from the delivering mechanism 1 and as will be readily seen these sheaves will lie flat within the basket collector 5 at this time so that their butts will be facing the forward end of the shocker.

The shocker consists of a main frame 7 which is suitably mounted on wheels 8 and 9 and the wheel 9 is substantially larger than the wheels 8 and acts as a driving mechanism for actuating the shocker during its dumping operation. This wheel 9 is keyed to the shaft 10 which is suitably journaled in the main frame and as it rotates the ratchet wheel 11 likewise rotates since it is also keyed to the shaft 10. The arm 12 is loosely mounted on the shaft 10 so as to rotate independently thereof, a pivoted finger 13 being normally held outwardly from the arm by a spring 14 so as to engage in one of the notches 15 of the ratchet wheel 11. A lug 16 projects from the other side of the arm 12. As the ratchet wheel 11 is rotated and the finger 13 is engaged in one of the notches 15 the arm 12 will likewise be rotated but as it reaches the upper portion of the shocker it will be noted that this finger will engage a wedge shaped plate 17 pivoted to the block 18 carried by the auxiliary frame 19 and be pressed inwardly toward the arm and therefore disengage from the notch 15 and stop rotating.

Figure 1:
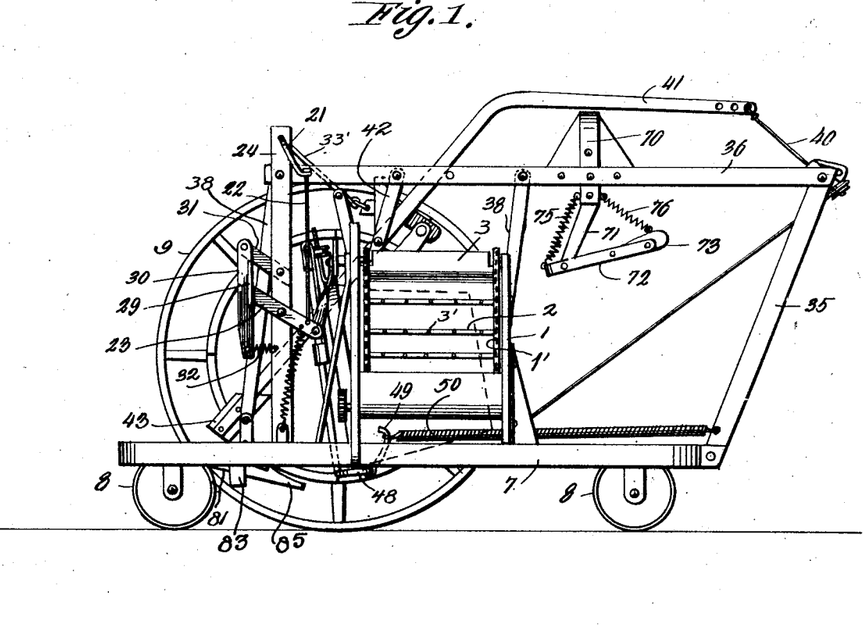
Figure 1 is a side elevation of the shocker showing that side which is positioned adjacent the binder.
Figure 2:
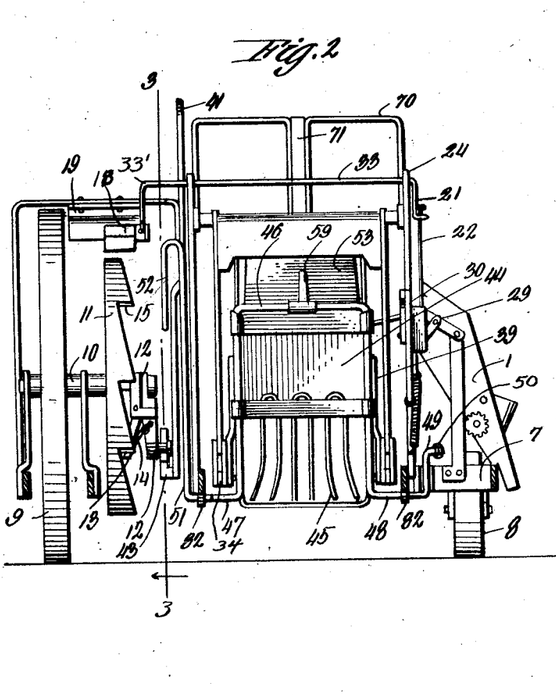
Figure 2 is a front elevational view of the shocker taken on line 2—2 of Figure 4.
Figure 3:
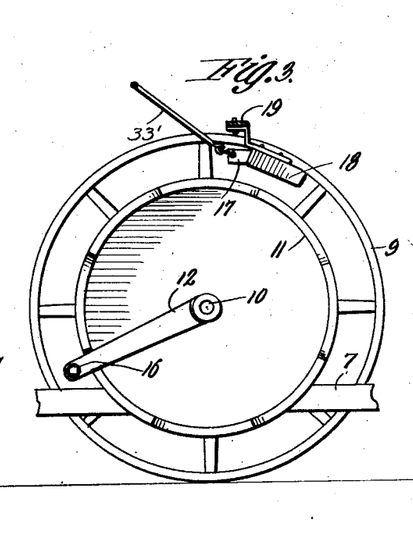
Figure 3 is a section taken on the line 3—3 of Figure 2 looking in the direction of the arrow.
Figures 4, 13:
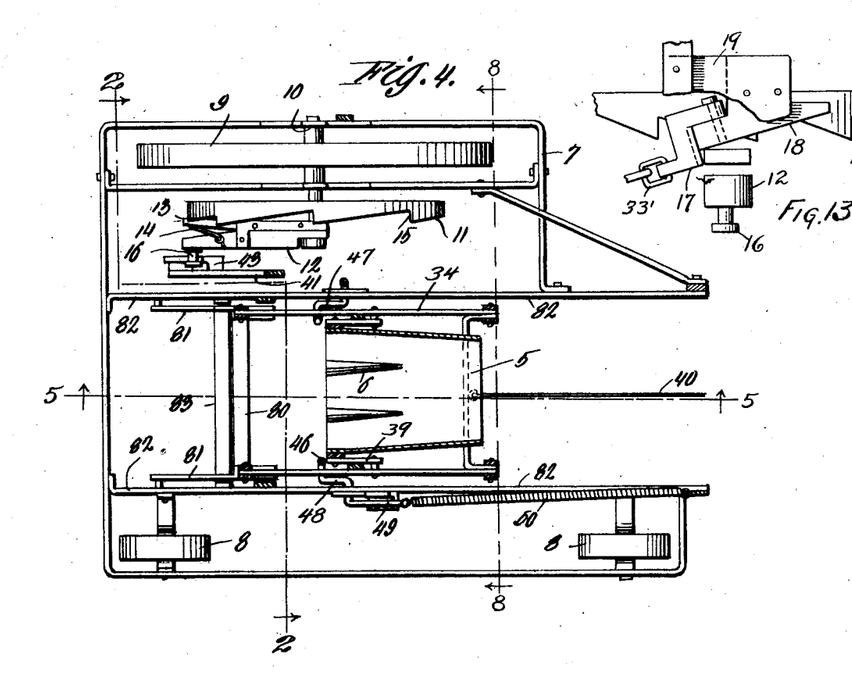
Figure 4 is a horizontal sectional view looking downwardly.
Figure 13 is a sectional plan view of the arm retaining plate.

When it is desired to start the operation of the shocker that is after sufficient sheaves have been delivered into the basket collector 5 the crank arm 21 will be lifted through the instrumentality of suitable operating mechanism, not shown, so as to pull upwardly on the rod 22 which in turn fulcrums the lever 23 pivoted on the standard 24 thereby pushing upwardly on the link 25 (see Fig. 9) which in turn fulcrums the lever 26 which is pivoted to a side board of the delivery mechanism 1 and lifts the plate 3 to a vertical position through the link 27 and crank 28. thus preventing any more sheaves from being delivered into the basket collector 5. It will also be noted that the lever 23 will be locked in this position by the block 29 carried by the rod 30 which is pivoted to one end of the arm 31 and is normally held in a locking position by a spring 32. The crank 21 is formed integral with the bar 33 which extends transversely across the top and forward end of the shocker and is rockably supported in the standards 24 as shown to advantage in Figure 8. Referring to Figures 2 and 3 it will be noted that the rocking of this bar 33 actuates a crank 33' at its other end thereby lifting upwardly on the plate 17 so that it will be disengaged from the finger 13 carried by the arm 12. The shocker is now ready to operate and the arm 12 will rotate with the ratchet wheel 11.

Besides the standard 24 the main frame 7 is provided with the rear standards 35 which support with the front standards 24 the upper longitudinally extending beams 36. A rocking frame 34 is mounted within the main frame 7 by means of the rocker arms 38 which are pivoted in any suitable manner to the rocking frame 34 and to the beams 36. The basket collector 5 is pivotally mounted within the rocking frame 34. This is accomplished by the pivot rods 39 which are fixed to each side of the basket and have their ends slightly offset and pivoted in any suitable manner to the rocking frame 34. A cable 40 is attached at one end to the frame 34 and passes over suitable pulleys mounted in the rear upper end of the main frame and is connected at its other end to a lever 41 which is pivotally mounted to an intermediate standard 42 and is provided at its lower end with an engaging block 43 which is adapted to engage with the lug 16 on the arm 12.

Figure 6:
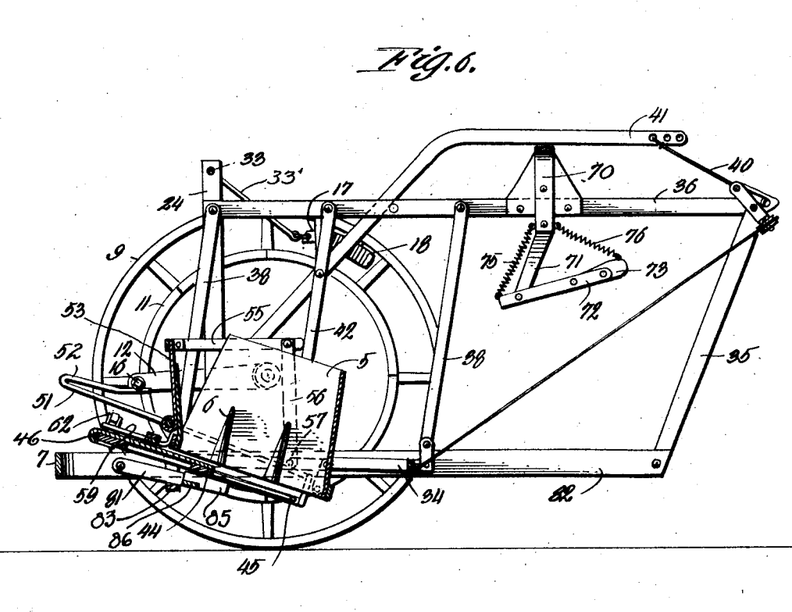
Figure 8:
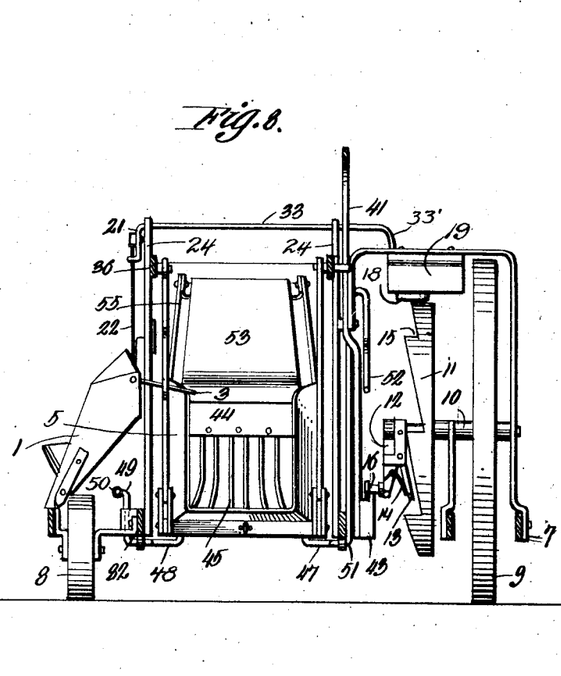
Figure 8 is a transverse sectional view taken through the shocker, substantially on line 8—8 of Fig. 4.
Figure 9:
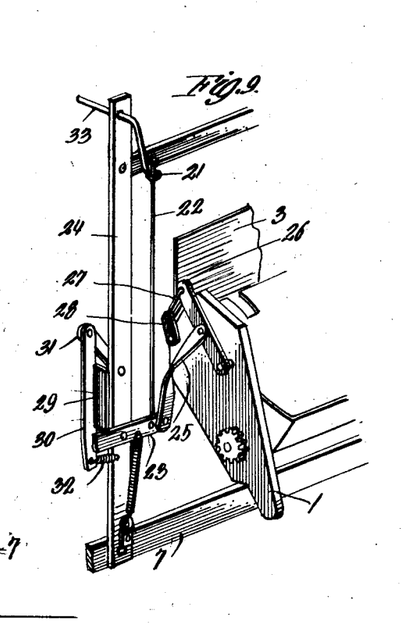
Figure 9 is a detailed perspective view showing the operation of the delivery mechanism in conjunction with the shocker.
Figures 10, 11:
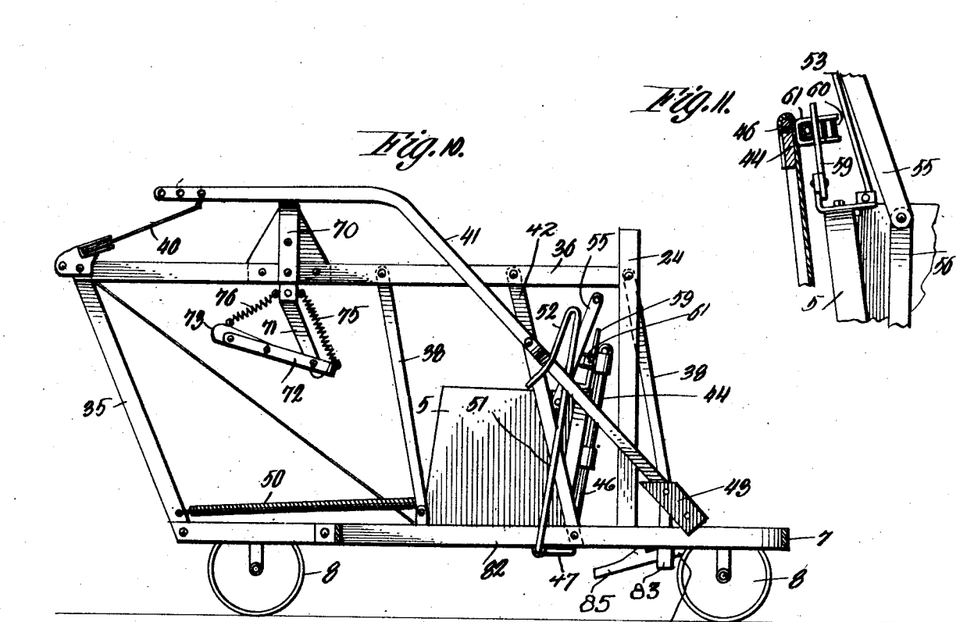
Figure 10 is a side elevation looking at the farther side of the shocker from the binder.
Figure 11 is a detailed sectional view on an enlarged scale showing the operation of the basket collector in conjunction with the tilting platform.
Figure 12:
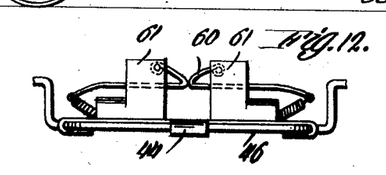
Figure 12 is a top plan view of the latch mechanism tilting platform.

A tilting platform 44 is mounted on the main frame so as to pivot forwardly as shown in Figure 6. This tilting platform consists of a body portion having a plurality of tines 45 extending therefrom which fit over the bottom of the basket collector as indicated in Figures 6 and 8. A rod 46 extends about the body portion of the tilting platform 44 and is provided with extensions 47 and 48 which are suitably journaled in the main frame 1. The extension 48 is provided with a crank 49 which is connected to a spring 50 which has its other end connected to one of the standards 35 so as to normally hold the tilting platform in a raised or vertical position. Another crank 51 is formed integral with the extension 47 and is provided with an engaging finger 52 at one end which is engaged by the lug 16 on the arm 12. A lid 53 is hingedly connected to the sides of the basket collector 5 so as to swing in the open side thereof by means of a pin 54. An arm 55 is pivoted to the top of the lid 53 at one end and its other end is pivotally connected to a similar arm 56 pivoted at 57 to the rocking frame 34 and will hold the lid in an open position when the basket is in the position as shown in Figure 5. Referring especially to Figures 11 and 12 it will be noted that the basket collector 5 is provided with a finger 59 which is adapted to be situated between the spring pressed jaws 60 which are a part of the latch mechanism 61 carried on the platform 44.

Figure 7:
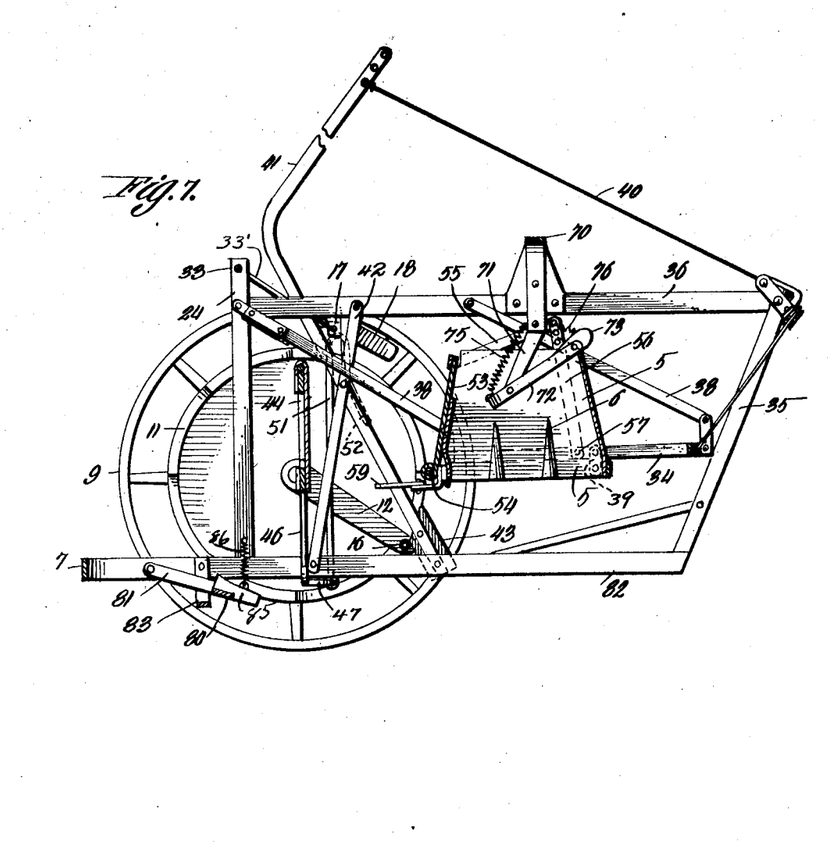

As the arm 12 rotates just after leaving a vertical position the lug 16 will engage the finger 52 of the crank 51 so as to cause the tilting of the platform from its position as shown in Figure 5 to the position shown in Figure 6. At the same time the finger 59 which is in engagement with the latch mechanism 61 will cause the basket collector 5 to be moved forwardly from the position shown in Figure 5 to the position shown in Figure 6 and at the same time the lid 53 will be moved toward the open side of the basket collector so as to compress the sheaves carried therein which will now have their butts resting on the tines 45 of the platform 44. As the shocker moves forwardly the arm 12 will continue to rotate and the lug 16 will disengage the finger 52 and the spring 50 will return the tilting platform 44 to its original position through the intermdiacy of the extension 48 and rod 46. In the meanwhile the lug 16 of the arm 12 will have engaged the engaging block 43 of the lever 41 thereby causing the fulcruming of this lever so as to pull upon the cable 40 thereby actuating the rocking frame 34 rearwardly and sliding the basket collector rearwardly therewith so as to allow the shocker to be positioned on the ground. The continued forward movement of the shocker will cause the lever 41 to be further fulcrumed so as to pull upon the cable 40 whereby the rocking frame 34 and basket collector 5 will be lifted to a position as shown in Figure 7 of the drawing or so as to clear the shock which has been left upon the ground.

A temporary holding mechanism for the basket collector 5 is provided for now engaging the same and is suspended from a cross piece 70 and consists of the depending arm 71 to which is fulcrumed a lever 72 having a nose 73. This lever 72 is held in the position shown in Figure 7 by means of the springs 75 and 76 which are of equal strength although they may be shown of different length. As shown in Figure 7 the lever 41 will be further fulcrumed so as to pull upon the cable 40 thereby slightly lifting the rocking frame 34 to a greater height whereby the basket collector may engage the nose 73 thereby slightly fulcruming the lever 72 until the nose 73 is in engagement with the rear inner inside of the basket collector and at this time the lug 16 of the arm 12 will be disengaged from the engaging block 43 and the weight of the basket collector 5 and the rocking frame 34 will cause the same to swing to their original position but in doing so the friction of the nose 73 against the rear inner side of the basket collector 5 will momentarily prevent the same from moving downwardly but not the rocking frame 34 and therefore the basket collector will turn so as to take its initial position since it will have to be tilted rearwardly as it moves downwardly so as to clear the nose 73 of the lever 72. During this operation the spring 75 will be stretched considerably as is evident and as soon as it is tilted forwardly the nose 73 will disengage from the rear inner side of the basket collector 5 and the spring 76 will return the lever 72 and its nose 73 to the initial position as shown in Figure 6. This tilting forwardly of the basket collector 5 causes the finger 59 to take a vertical position and also to open the lid 53. As the rocking frame 34 moves to its lower point the finger 59 will engage the spring pressed jaws 60 so as to separate the same and allow the finger to be positioned between them and the tilting platform 44 as shown in Figure 11. Thus it will be seen that the basket collector is now in a position to receive more sheaves and the operation just explained may be continued as should now be well understood.

As shown to advantage in Figures 5 and 6 the rocking frame 34 is normally held in firm engagement with the tilting platform by the construction which consists of the levers 81 which are pivoted to the longitudinal beams 82 of the main frame and are normally held in a raised position by the spring 86 and are connected by the bar 80. Each lever is provided with an enlargement 85 which engages the swinging frame so as to hold the basket in a firm position, that is so as to abut the tilting platform. When the tilting platform strikes the bar 80 the levers will be moved so as to abut the cross member 83 and the rocking frame will be free to move.

From the foregoing description, taken in connection with the accompanying drawings, it is thought that the construction and operation of the shocker will be readily understood by those skilled in the art without a further explanation. As numerous changes in form, construction, and in the combination and arrangement of the various parts may be resorted to without departing from the spirit of the invention, I do not wish to be limited to the embodiment shown except as hereinafter claimed.

Having thus described my invention what I claim as new is:

1. In a shocking machine, a main frame, a basket collector supporting frame, rods pivotally mounted in the main frame and pivotally secured to the basket collector supporting frame so as to rockably mount the same in the main frame, a basket collector mounted in the supporting frame, means for delivering sheaves into the basket collector, means for rocking the supporting frame to a raised position, means operable simultaneously with the last mentioned means for moving the basket collector to a dumping position as the supporting frame is being raised, and means for frictionally engaging the basket collector when in raised position so as to hold it momentarily as the supporting frame moves to a lowered position.

2. In a shocking machine, a main frame, a basket collector supporting frame rockingly mounted on the main frame, a basket collector mounted in the supporting frame, a cable trained over the main frame and attached to the supporting frame, a lever pivoted to the main frame and attached to the cable at one end, and means for engaging the other end of the lever so as to fulcrum the same for pulling upon the cable thereby raising the supporting frame.

3. In a shocking machine, a main frame, a basket collector supporting frame rockingly mounted on the main frame, a basket collector mounted in the supporting frame, means for delivering sheaves into the basket collector, a lever fulcrumed on the main frame, a cable attached at one end to the supporting frame and at its other end to the lever, a wheel on the main frame, a ratchet on the wheel, an arm engageable with said ratchet and with said lever so that upon rotation of the wheel the lever will be fulcrumed for raising the supporting frame through the intermediacy of the cable, and means for disengaging the arm from the ratchet.

4. In a shocking machine, a main frame, a basket collector supporting frame rockingly mounted on the main frame, a basket collector mounted in the supporting frame, means for delivering sheaves into the basket collector, a pivoted mechanism for raising the basket collector, a rocking mechanism for the supporting frame, a wheel mounted on the main frame, a ratchet on the wheel, a rod engageable with the ratchet and with the pivoted mechanism and the rocking mechanism upon rotation of the wheel, and means for disengaging the rod from the ratchet.

5. In a shocking machine, a main frame, a basket collector supporting frame rockingly mounted on the main frame, a basket collector mounted in the supporting frame and including a structure consisting of three sides only, a bottom associated with said basket collector, a lid associated with said basket collector, means for rocking the supporting frame and moving the basket collector to a dumping position simultaneously, and means for opening the bottom and closing the lid simultaneously as the supporting frame is rocked to a raised position.

In testimony whereof I affix my signature.

HANS P. OLSEN.